United States Patent

[11] 3,575,071

| [72] | Inventors | Raymond J. Miller<br>Sun City, Ariz.;<br>Jesse W. Elliott, Dayton; Ralph R. Nevin,<br>Piqua, Ohio |
|---|---|---|
| [21] | Appl. No. | 837,725 |
| [22] | Filed | June 30, 1969 |
| [45] | Patented | Apr. 13, 1971 |
| [73] | Assignee | H & H Industries, Inc.<br>Dayton, Ohio |

[54] TEMPLATE SUPPORT APPARATUS FOR A MACHINE TOOL
10 Claims, 7 Drawing Figs.

[52] U.S. Cl............................................................ 82/14,
90/13.9, 90/62
[51] Int. Cl............................................................ B23b 3/28,
B23c 1/18
[50] Field of Search............................................ 82/14, 14.1,
14.2, 14.3, 14.4, 14.5; 90/62, 13, 13.9

[56] References Cited
UNITED STATES PATENTS

| 3,156,144 | 11/1964 | Weaver...................... | 82/14 |
| 3,185,003 | 5/1965 | Jeanneret.................. | 82/14 |
| 3,200,682 | 8/1965 | Brusque..................... | 82/14 |

*Primary Examiner*—Gil Weidenfeld
*Attorney*—Marechel, Biebel, French & Bugg

ABSTRACT: A precision turning machine is provided with an automatic hydraulic tracer control unit including a stylus adapted to engage a template. A carriage supports the template and is shiftable horizontally on an angle relative to the turning axis and in incremental steps in response to indexing of a wheel having a plurality of individually adjustable stop screws. The carriage and template are shiftable in precise increments between successive passes of the cutting tool to produce automatic successive roughing and finishing cutting operations according to the contour of the template.

Patented April 13, 1971
3,575,071
2 Sheets-Sheet 1
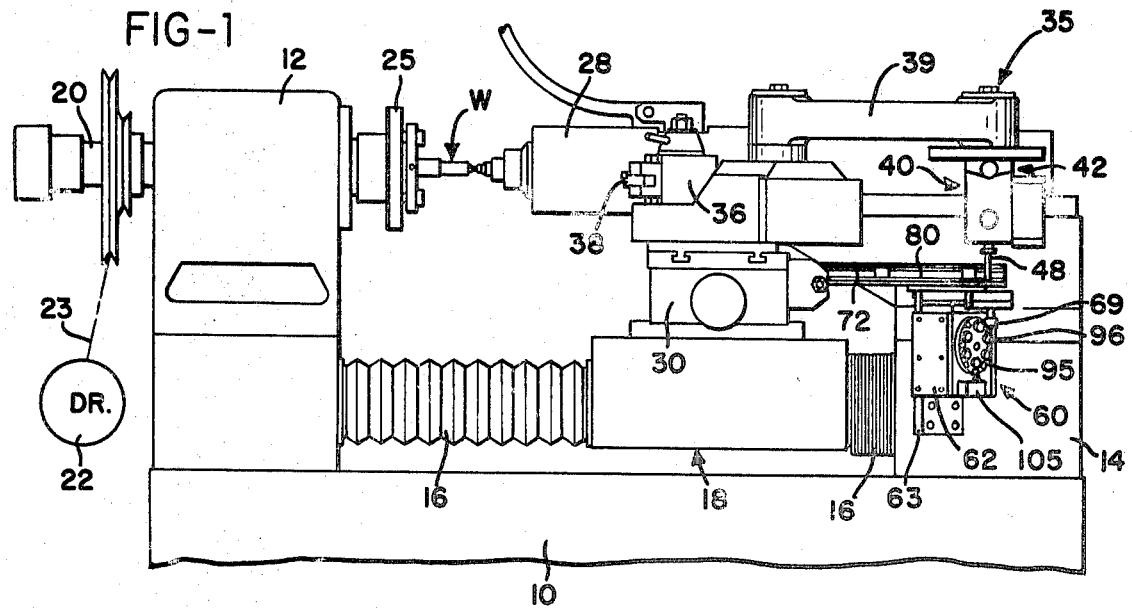
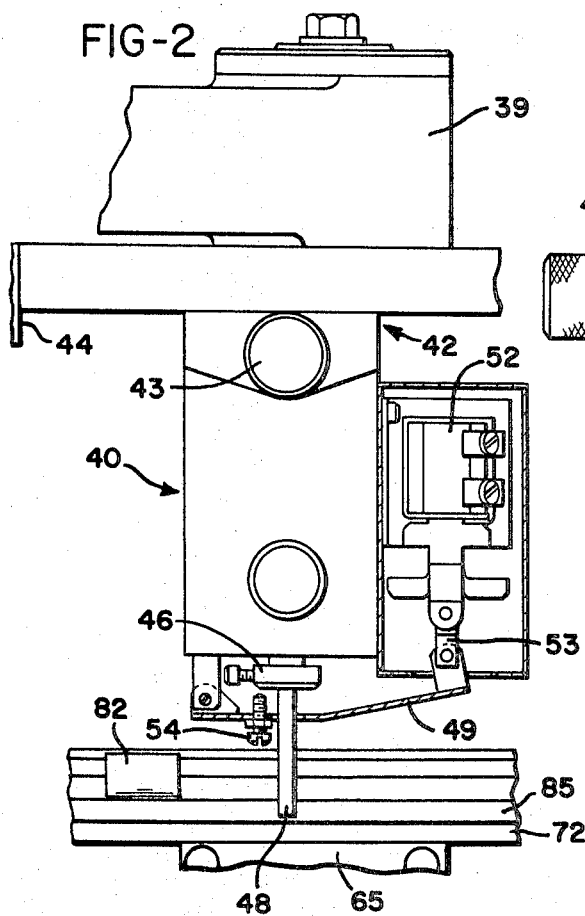
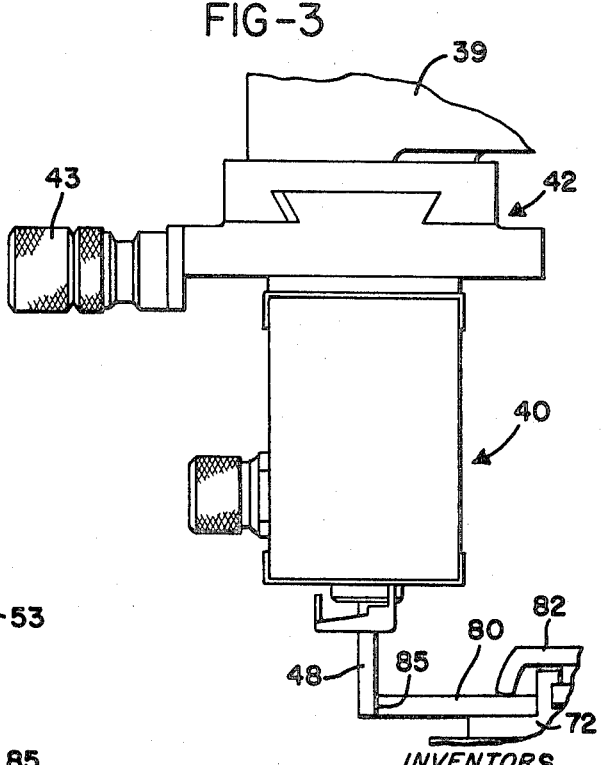
INVENTORS
RAYMOND J. MILLER,
JESSE W. ELLIOTT &
RALPH R. NEVIN
BY
Marechal, Biebel, French & Bugg
ATTORNEYS

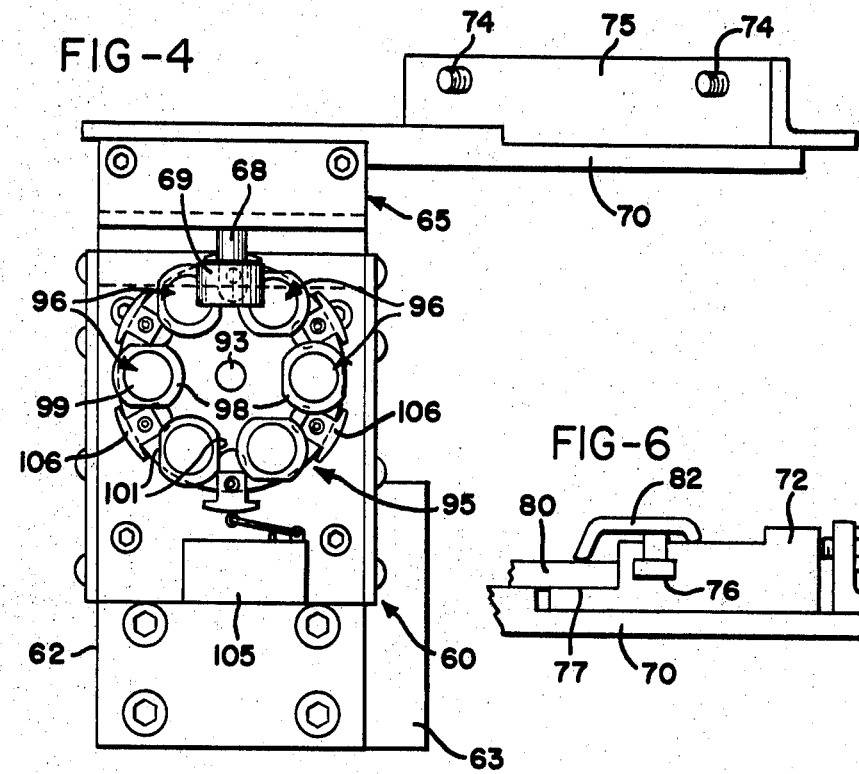
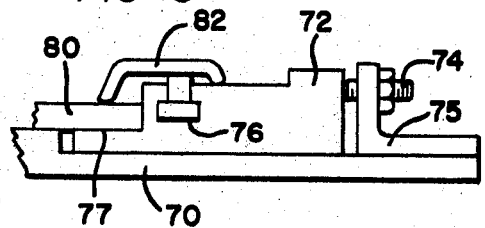
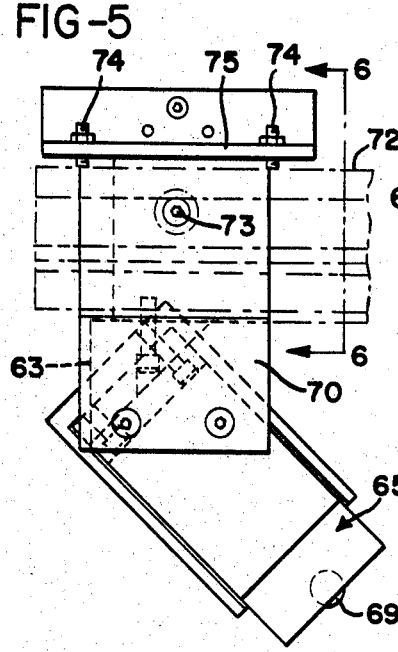
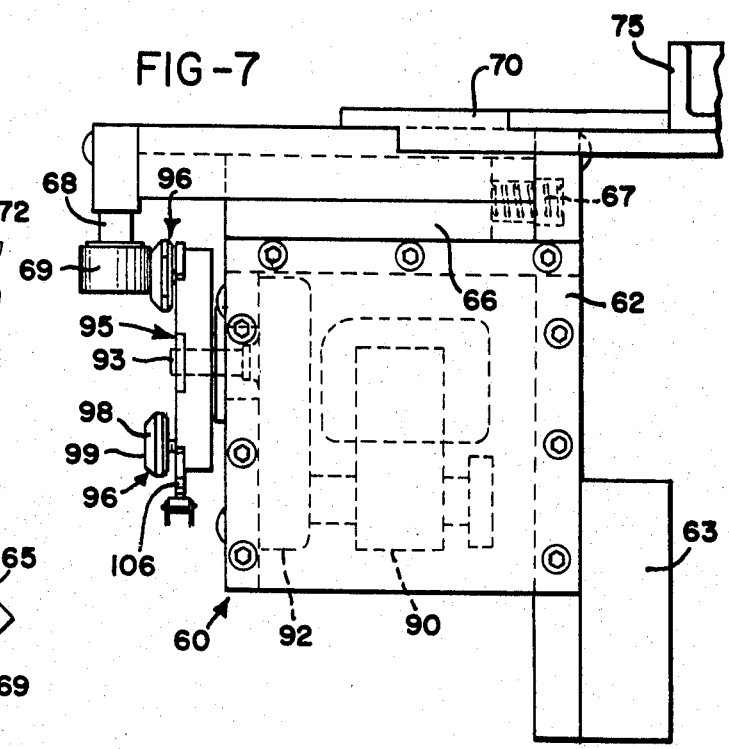

TEMPLATE SUPPORT APPARATUS FOR A MACHINE TOOL

BACKGROUND OF THE INVENTION

It is frequently desirable to employ an automatic hydraulic tracing unit on a lathe or turning machine to provide for turning or shaping a workpiece according to a predetermined contour as determined by a template used in conjunction with the tracing unit. Usually, the tracing unit hydraulically controls the movement of the cross slide on the carriage of the machine according to the movement of a stylus along a contoured edge of the template. Sometimes, a hydraulic tracing unit incorporates means for shifting the cutting tool inwardly in incremental steps between successive passes of the cutting tool along the workpiece to perform successive roughing and finishing cutting operations on the workpiece, each corresponding to the contour of the template.

One method of obtaining the infeed shifting of the cutting tool is accomplished by providing incremental adjustment of the spacing between the cutting tool and the stylus with a shifting mechanism incorporated in the tracing unit. Such a mechanism significantly increases the cost of the tracer unit and provides unnecessary additional cost when the tracer unit is used solely for machining operations where multiple passes of the tool element are not required.

Infeed movement of the cutting tool in incremental steps between successive machining operations has also been accomplished by using a series of hinged templates each being manually positioned for engagement by the stylus or by mounting one template on a manually operated cross slide which enables the template to be manually adjusted inwardly after each cutting pass. It has been found, however, that neither of these systems is adapted to automatic operation of the machine tool and tracing unit and does not provide for quickly obtaining precise incremental shifting movements of the template to obtain successive roughing and finishing operations.

SUMMARY OF THE INVENTION

The present invention is directed to an improved apparatus adapted to be mounted on a lathe or other machine tool for supporting a template and provides for shifting the template automatically in response to each pass of the cutting tool along the workpiece and in precise predetermined incremental steps. The apparatus of the invention is simple in construction, dependable and precise in operation and can be easily attached to a machine tool having an automatic tracer control unit to provide for automatically making successive roughing and finishing operations either on the diameter or on a radial face of the workpiece and with each operation corresponding to the contour of the template.

In accordance with a preferred embodiment of the invention, the apparatus incorporates a housing or frame adapted to be mounted on a turning machine and which supports a carriage for sliding horizontal movement at an angle of 45° relative to the axis of the machine. A template bar or rail is mounted on the carriage at a 45° angle and supports the template in parallel position to the axis of the machine for engagement of the stylus which depends vertically from a hydraulic tracer control unit. An index wheel is mounted on the frame for rotation on a horizontal axis and supports a plurality of angularly arranged stop screws each being adjustable in a direction parallel to the direction of movement of the carriage. The wheel also supports a corresponding plurality of switch actuators.

A drive motor is mounted on the frame and is connected to index the wheel for selectively moving the stop screws in position for engagement by a roller mounted on the carriage. At the end of each machining operation or pass of the cutting tool, the motor is energized for a predetermined time sufficient to index the wheel and present another stop screw for engagement by the follower so that the template shifts inwardly on an angle of 45° and by a precise predetermined distance for the next successive machining operation.

BRIEF DESCRIPTION OF THE DRAWINGS

FIG. 1 is a fragmentary elevational view of a precision lathe incorporating a hydraulic tracer unit and having a template supporting apparatus constructed in accordance with the invention;

FIG. 2 is an enlarged fragmentary view of the stylus supporting mechanism of the hydraulic tracer control unit shown in FIG. 1;

FIG. 3 is another enlarged fragmentary view of the stylus supporting mechanism shown in FIG. 2;

FIG. 4 is an enlarged elevational view of the template supporting apparatus shown in FIG. 1;

FIG. 5 is a plan view of the template supporting apparatus shown in FIG. 4;

FIG. 6 is a fragmentary view taken generally on the line 6–6 of FIG. 5; and

FIG. 7 is a side elevational view of the template supporting apparatus shown in FIG. 4.

DESCRIPTION OF THE PREFERRED EMBODIMENT

The precision turning machine shown in FIG. 1 generally includes a base 10 preferably formed of granite. A set of housings 12 and 14 are mounted on opposite ends of the base 10 and are connected by a pair of horizontally extending cylindrical guide rods (not shown) each covered by a pair of flexible tubular bellows 16 extending from the housing 12 and 14 to opposite ends of a carriage 18 slidably mounted on the guide rods.

A spindle 20 is rotatably supported by the housing 12 and is driven from a motor 22 through a belt drive 23. A chuck 25 is mounted on the inner end of the spindle 20 and is effective to grip and support one end of a workpiece W which is to be machined. The other end of the workpiece is supported by an adjustable rotatable tail stock 28 mounted on the housing 14. The carriage 18 is moved horizontally on the guide rods by a horizontally extending hydraulic cylinder (not shown) mounted on the housing 12 and having a piston rod connected to the carriage 18 between the guide rods. The carriage 18 supports a cross slide 30, and a hydraulic tracer unit 35 is mounted on the cross slide.

A tool post 36 is secured to the tracer unit 35 and supports a tool element 38. The hydraulic tracer unit 35 includes an arm 39 which pivots or rotates on a vertical axis, and a head 40 is connected to the arm 39 through a compound slide 42 having knobs 43 and 44 which provide for X-Y adjustment of the head 40. Hydraulic valves (not shown) are enclosed within the head 40 and include a vertically movable valve member 46 which supports a depending stylus 48.

Actuation of the valves within the head 40 is obtained by elevating the valve member 46 with the aid of a lever 49 having one end pivotally connected to the head 40 by a pin 51 and its other end connected to a solenoid 52 by a link 53. An adjusting screw 54 is mounted on the lever 49 and engages the valve member 46 when the solenoid 52 is energized to effect retraction of the arm 39 and a corresponding retraction of the tool element 38 from the workpiece W as will be explained later.

In accordance with the present invention, a template holder 60 (FIGS. 1, 4 and 5) includes a frame 62 which is mounted on one side of a 45° angle bracket 63 (FIGS. 4 and 5) secured to the housing 14 so that the holder is located generally under the arm 39 and head 40 of the hydraulic tracer unit 35. A carriage 65 (FIG. 5) is slidably mounted on the housing 62 by guideways 66 and is normally urged to the right (FIG. 5) by a compression spring 67 extending between the one end of the carriage 65 and the guideways 66. A vertical shaft 68 depends from the other end of the carriage 65 and supports a roller 69.

A stepped plate 70 (FIGS. 4 and 5) is secured to the carriage 65 and supports an elongated template support bar or rail 72 which is secured to the plate by a screw 73. The rail 72 extends parallel to the axis of the spindle 20 and can be adjustably positioned relative to the plate 70 by a pair of laterally spaced adjusting screws 74 extending through the upper flange of an angle bracket 75 secured to the plate 70. The rail 72 includes a longitudinally extending inverted T-slot 76 and a stepped surface 77. An elongated flat platelike template 80 is mounted on the surface 77 and is secured by a plurality of longitudinally spaced brackets 82 each receiving a threaded fastener extending from the inverted T-slot 76. The template 80 has an edge surface 85 (FIG. 3) contoured according to the profile or contour desired on the workpiece W, and the surface 85 is adapted to be engaged by the depending stylus 48 of the hydraulic tracer unit 35.

An electric motor 90 (FIG. 5) is mounted on the frame 62 and is coupled to a gear reducer 92 having a horizontally extending output shaft 93. The circular stop member or wheel 95 is mounted on the shaft 93, and a plurality of peripherally spaced stop elements or screws 96 are threaded into the wheel 95 with their axes extending parallel to the shaft 93. Each of the stop screws 96 has a large buttonlike head having a tapered or frustoconical surface 98 extending from a flat circular end surface 99. The head of each stop screw 96 also has opposing flat surfaces 101 (FIG. 4) for adjusting the screw with an open end wrench. As shown in FIG. 5, the stop screws 96 are angularly positioned on the wheel 95 so that each stop screw will engage the roller 69 when the wheel 95 is rotated. A switch 105 is supported below the wheel 95 and is actuated by cam members 106 slidably mounted on the wheel 95 between the stop screws 96. Each cam member 106 is radially extendable so that it will engage the switch actuator when the wheel is rotated. The switch is connected to effect intermittent operation of the motor 90 and corresponding indexing of the wheel 95.

In operation, a template 80 having a contoured edge surface 85 corresponding to the surface profile desired on the workpiece W, is secured to the template rail 72, and the stop screws 96 are each adjusted on the wheel 95 according to the desired infeed of the cross slide 30 between the successive cutting operations. While six adjusting screws 96 are shown in FIG. 4 for obtaining a total of six roughing and finishing operations, more or less adjusting screws 96 may be employed as required.

After each pass of the tool element 38 along the workpiece W, a limit switch (not shown) is actuated to energize the solenoid 52 which causes elevation of the stylus 48 and the valve member 46 to effect retraction of the stylus from the contoured edge surface 85 of the template 80. When the stylus 48 and the arm 39 retract, another switch (not shown) is actuated to energize the motor 90 for indexing of the wheel 95 until another stop screw 96 engages the roller 69, and the switch 105 deenergizes the motor 90. This effects a corresponding inward shifting movement of the carriage 65 and template 80 in a direction forming a 45° angle with the axis of the workpiece W. The tool element 78 then makes another pass along the workpiece W according to the contour of the template surface 85 after which the stylus 48 is again retracted and the wheel 95 indexed to present another stop screw 96. In this manner, the carriage 65 and the template 80 are shifted inwardly at a 45° angle in incremental steps corresponding to the adjustment of the stop screws 96 on the wheel 95.

From the drawings and the above description, it is apparent that a machine tool provided with a tracer unit 35 and a template holder 60 can automatically machine a workpiece in successive cutting operations during each of which the tool element 38 follows the contour of the template surface 85. The template holder 60 is especially suited for automatic operation of the lathe and assures that the template 80 is shifted inwardly in precise predetermined incremental steps for obtaining a precise predetermined depth of cut by the tool element 38 during each pass of the tool element. Moreover, the shifting of the template on a 45° angle relative to the spindle axis enables successive cuts to be taken on a workpiece for finishing the diameter and/or a radial face.

The template support holder 60 is also compact and simple in construction and incorporates its own motor 90 for indexing the wheel 95 so that the holder 60 can be conveniently and quickly installed on a lathe in a manner to cooperate with the automatic operation of the lathe and the hydraulic tracer unit 35. Moreover, the surfaces 98 and 99 on the head of each stop screw 96 cooperate with the roller 70 to assure smooth shifting movements of the carriage 65 and template 80.

While the form of apparatus herein described constitutes a preferred embodiment of the invention, it is to be understood that the invention is not limited to this precise form of apparatus, and that changes may be made therein without departing from the scope and spirit of the invention.

We claim:

1. Apparatus adapted to be mounted on a machine tool, said apparatus comprising means for supporting a template adapted to be engaged by a stylus of an automatic tracer control unit, a frame, a carriage, means mounted on said frame and supporting said carriage for linear movement, means on said carriage for supporting the template, a movable stop member supported by said frame, a plurality of individually adjustable stop elements mounted on said stop member, means mounted on said frame for moving said stop member in incremental steps for positioning each said stop element at a predetermined station, and means mounted on said carriage for engaging each said stop element when positioned at said station to effect shifting of said carriage and the template in incremental steps according to the setting of said stop elements relative to said stop member.

2. Apparatus as defined in claim 1 wherein said stop member comprises a wheel, said stop elements are mounted on said wheel in angularly spaced relation, and said moving means comprises a motor effective to index said stop member.

3. Apparatus as defined in claim 2 wherein each said stop element comprises a stop screw adjustable axially on said wheel, and including a head having a cam surface adapted to engage said means mounted on said carriage.

4. Apparatus as defined in claim 3 wherein said engaging means comprises a roller.

5. Apparatus as defined in claim 2 wherein said wheel is rotatable on an axis extending parallel to the direction of movement of said carriage, and each said stop element is adjustable in a direction parallel to the rotatable axis of said wheel.

6. Apparatus as defined in claim 1 including spring means urging said carriage in a direction to effect engagement of said means mounted on said carriage with each said stop element when positioned at said station.

7. Apparatus as defined in claim 1 wherein said means for supporting the template comprise a rail mounted on said carriage, and means for adjusting the position of said rail relative to said carriage.

8. Apparatus as defined in claim 1 in combination with a hydraulic tracer control unit including a stylus adapted to engage the template, said stylus being removable axially to effect actuation of a hydraulic control valve, and solenoid actuated means for shifting said stylus axially to operate said valve.

9. Apparatus as defined in claim 1 including means for mounting said frame on the machine tool to effect movement of said carriage in a direction forming an acute angle relative to a vertical plane extending through the rotary axis of the machine tool.

10. Apparatus as defined in claim 9 wherein said supporting means for the template is effective to position the template generally parallel to the rotary axis of the machine tool and in angular relation to the direction of movement of said carriage.